July 22, 1924.
C. P. COX
1,502,497
KITCHEN IMPLEMENT
Filed March 10, 1923
2 Sheets-Sheet 1
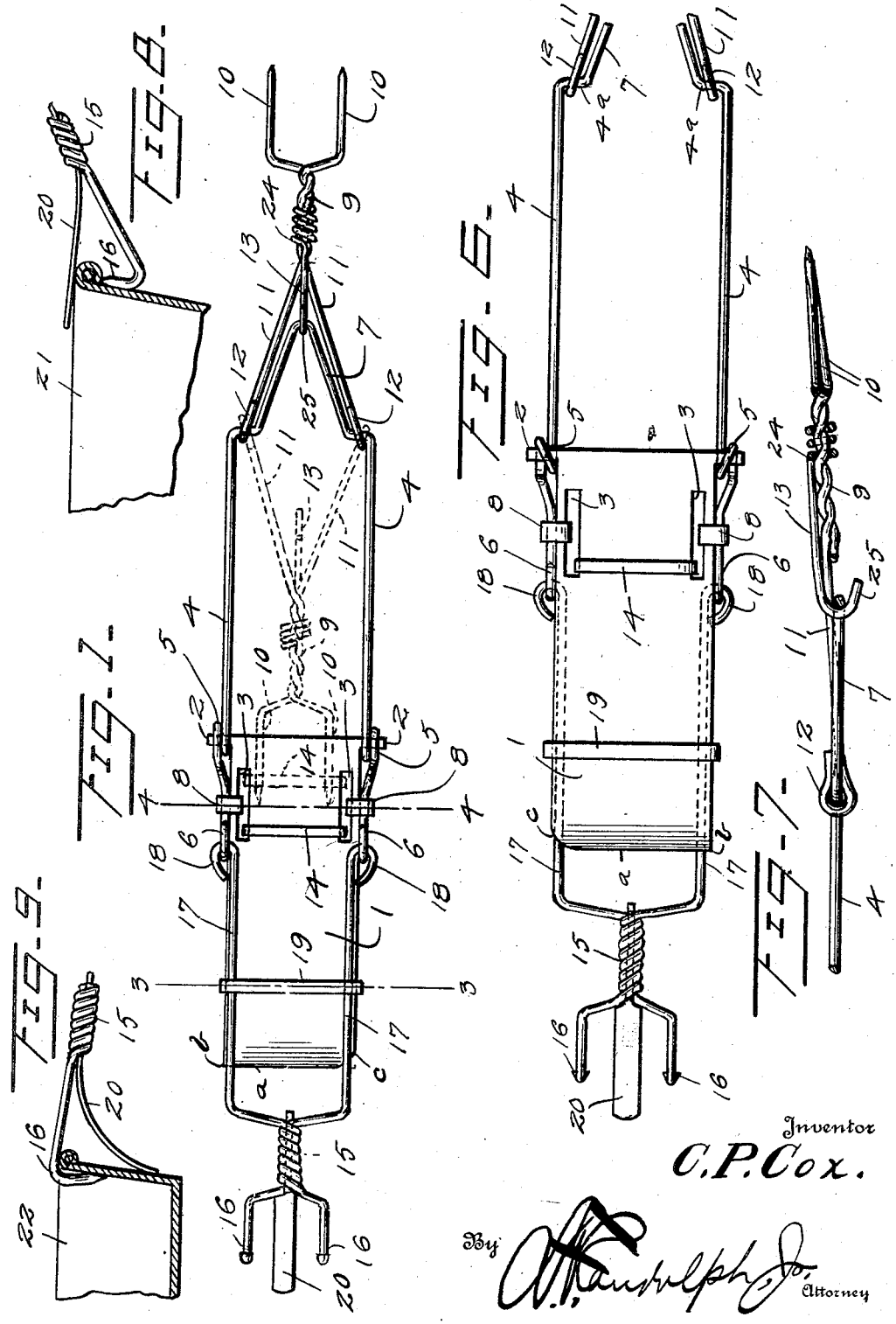
Inventor
C. P. Cox.

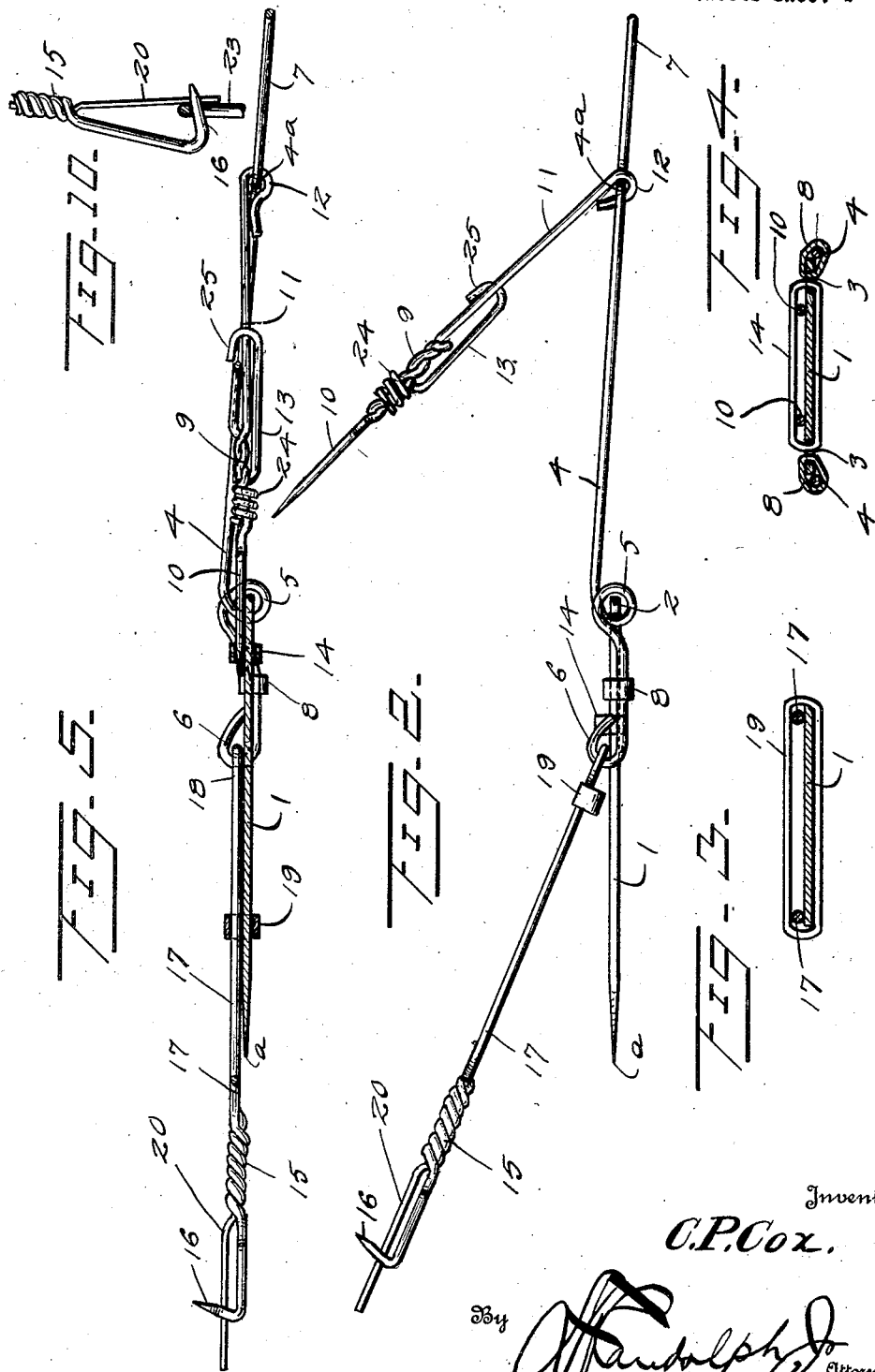

Patented July 22, 1924.

1,502,497

UNITED STATES PATENT OFFICE.

CHARLES P. COX, OF TOLEDO, OHIO.

KITCHEN IMPLEMENT.

Application filed March 10, 1923. Serial No. 624,174.

*To all whom it may concern:*

Be it known that I, CHARLES P. COX, a citizen of the United States, residing at Toledo, in the county of Lucas and State of Ohio, have invented certain new and useful Improvements in Kitchen Implements; and I do hereby declare the following to be a full, clear, and exact description of the invention, such as will enable others skilled in the art to which it appertains to make and use the same.

The invention provides a single organized structure embodying a plurality of implements for use in the kitchen, whereby bake pans, pastry tins, pot covers, stove lids and articles of food in process of cooking may be safely and conveniently handled without endangering the burning or scalding of the cook, said implement being simple, light and easy and convenient of manipulation and readily convertible from one use to another, as may be required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of the implement, the fork being shown extended by full lines and folded by dotted lines, Figure 2 is a side view, the fork and the pan engaging and pot lifting member being partly folded, Figure 3 is a transverse section on the line 3—3 of Figure 1, Figure 4 is a cross section on the line 4—4 of Figure 1, Figure 5 is a longitudinal section showing the fork folded, Figure 6 is a reverse plan view, having portions of the stove cover lifter and fork broken away, Figure 7 is a detail section showing means for holding the fork in operative position, Figure 8 is a detail view showing the implement in engagement with a pan, Figure 9 is a detail view showing the implement in engagement with a pastry tin, and Figure 10 is a detail view showing the implement in connection with the bail of a pot.

Corresponding and like parts are referred to in the following description and designated in the several views of the drawings by like reference characters.

The implement comprises a blade 1 which may be of any determinate length and width, said blade being sharpened at one edge to provide a scraper $a$ and one corner adjacent the sharpened edge $a$ being square to provide an angular scraper $b$ and the opposite corner being round to provide a scraper $c$ of corresponding shape. Lugs 2 project laterally from opposite edges of the blade at the other end and longitudinal slots 3 are formed in edge portions of the blade a short distance from the lugs 2. The blade 1 is susceptible of a variety of uses which will readily suggest themselves. A wire frame is attached to the end of the blade 1 provided with the lugs 2 and slots 3 and comprises side members 4 provided intermediate their ends with coils 5 which receive the lugs 2 and having terminal eyes 6. The outer end of the frame is formed with a V-shaped extension 7 which constitutes a lifter for stove lids and pot covers. Binders 8 engage in the slots 3 and the adjacent side portions 4 of the frame between the coils 5 and eyes 6, thereby fixing the position of the frame and holding the same in determinate relation.

A fork is pivotally mounted upon the outer end of the wire frame and comprises two lengths of wire of suitable gage intertwisted intermediate their ends to provide a shank 9 and spread and extended at one end to provide tines 10 and spread and extended at the opposite end to provide attaching members 11 which terminate in eyes 12 to receive lateral offset portions 4ª of the side members 4 at the base of the V-shaped extension 7. The fork is adapted to fold within the plane of the wire frame and with the tines 10 engaging a side of the blade 1 against which it is retained by means of a slide 14 engaging the slots 3.

A second wire frame is pivoted to the side members 4 of the first mentioned wire frame and constitutes a bake pan and pastry tin lifter, whereby such articles may be turned or otherwise manipulated to prevent burning of the hand. This second wire frame comprises two wires intertwisted intermediate their ends to provide a shank 15 and spread and bent at one end to provide hooks 16 and having the opposite end spread and extended to form side members 17 which terminate in eyes 18 looped into the eyes 6, whereby to pivotally connect the two wire frames. A slide 19 mounted upon the side members 17 is adapted to engage the blade 1 and hold said second wire frame in the plane thereof. A flat spring 20 cooperates with the hooks 16 and an end portion thereof is engaged by the intertwisted portions of the wires forming the shank 15 and this spring 20 coacts with the hooks 16 to hold the implement in position when applied to a bake pan, pastry tin or analogous utensil.

Referring to Figure 8, which shows the implement applied to a bake pan 21 for moving the same, the free end of the spring 20 engages over the upper edge of the pan, whereas the hooks 16 are adjusted to bear against the outer side of the pan and engage under the bead or flange at the upper edge thereof. Figure 9 shows the implement fitted to a pastry tin and in this adaptation the hooks 16 extend over and engage the inner side of the tin near the top thereof, whereas the free end of the spring 20 is deflected downwardly and engages the outer side of the tin near the bottom thereof. Figure 10 shows the implement as used for lifting pots and other utensils provided with bails and in this figure, the numeral 23 designates the bail which is engaged by the hooks 16, the free end of the spring 20 engaging the bail to prevent disengagement thereof from the hooks 16. The fork is extended when positioned for use and is held in such position by suitable means such as a slide 24 mounted upon the shank 9 and having a hook 25 to engage the outer end of the cover lifter 7.

What is claimed is:

1. A kitchen implement of the character specified, comprising a blade, a frame attached to an end portion of the blade and projecting longitudinally therefrom to provide a lifter, and a second frame having pivotal connection with the first mentioned frame and constituting a bake pan and pastry tin lifter, and coacting means between the second frame and blade to hold the parts in determinate position.

2. A kitchen implement of the character specified, comprising a blade, a frame attached to an end portion of the blade and projecting longitudinally therefrom to provide a lifter, and a second frame having pivotal connection with the first mentioned frame and constituting a bake pan and pastry tin lifter, coacting means between the second frame and blade to hold the parts in determinate position, and a fork pivotally mounted upon the outer portion of the first mentioned frame and adapted to fold upon the blade.

3. A kitchen implement of the character specified, comprising a blade, a frame attached to an end portion of the blade and projecting longitudinally therefrom to provide a lifter, and a second frame having pivotal connection with the first mentioned frame and constituting a bake pan and pastry tin lifter, coacting means between the second frame and blade to hold the parts in determinate position, a fork pivotally mounted upon the outer portion of the first mentioned frame and adapted to fold upon the blade, and means mounted upon the blade for engaging and retaining the fork in folded position.

4. A kitchen implement of the character specified, comprising a blade, a frame attached to an end portion of the blade and projecting longitudinally therefrom to provide a lifter, and a second frame having pivotal connection with the first mentioned frame and constituting a bake pan and pastry tin lifter, coacting means between the second frame and blade to hold the parts in determinate position, a fork pivotally mounted upon the outer portion of the first mentioned frame and adapted to fold upon the blade, and cooperating means between the fork and the frame to which the fork is pivoted for holding said fork in operative position.

5. In an implement of the character specified, a frame comprising elements intertwisted to form a shank and having an end portion spread and bent to provide hooks, a spring coacting with the hooks and secured to the frame by being engaged within the intertwisted portions of the elements thereof, said spring disposed between said hooks and normally occupying a position within the zone thereof and acting as a keeper therefor, and said spring adapted to be flexed to occupy a position beyond the free terminals of said hooks.

In testimony whereof I affix my signature in presence of two witnesses.

CHARLES P. COX.

Witnesses:
J. W. MOODY,
H. KALISKY.